US011909504B1

(12) United States Patent
Legrand et al.

(10) Patent No.: US 11,909,504 B1
(45) Date of Patent: Feb. 20, 2024

(54) COMMUNICATION WITH MULTIPLE SATELLITE NETWORKS

(71) Applicant: Hubble Network Inc., Las Vegas, NV (US)

(72) Inventors: Louis Legrand, Seattle, WA (US); Ben Juda Wild, Seattle, WA (US)

(73) Assignee: Hubble Network Inc., Las Vegas, NV (US)

( * ) Notice: Subject to any disclaimer, the term of this patent is extended or adjusted under 35 U.S.C. 154(b) by 0 days.

(21) Appl. No.: 17/989,596

(22) Filed: Nov. 17, 2022

(51) Int. Cl.
*H04B 7/185* (2006.01)
*G01S 19/42* (2010.01)
*G01S 19/27* (2010.01)

(52) U.S. Cl.
CPC .......... *H04B 7/18513* (2013.01); *G01S 19/27* (2013.01); *G01S 19/42* (2013.01); *H04B 7/18519* (2013.01)

(58) Field of Classification Search
CPC .......... G01S 19/27–42; H04B 7/18513–18519
See application file for complete search history.

(56) References Cited

U.S. PATENT DOCUMENTS

| | | | |
|---|---|---|---|
| 2021/0255333 A1* | 8/2021 | Sornin | G01S 19/258 |
| 2021/0382180 A1* | 12/2021 | Hua | G01S 19/256 |
| 2022/0321206 A1* | 10/2022 | Shrestha | H04W 56/004 |
| 2023/0131074 A1* | 4/2023 | Sornin | G01S 19/42 |
| | | | 455/456.1 |

* cited by examiner

*Primary Examiner* — Khaled M Kassim
*Assistant Examiner* — Najeeb Ansari
(74) *Attorney, Agent, or Firm* — Nicholson De Vos Webster & Elliott LLP (57) ABSTRACT

Techniques for leveraging information from a first satellite network to improve communications with a second satellite network are described. According to some embodiments, an endpoint device in an LPWAN communicates with satellites in a GNSS as well as with satellites in another satellite network (e.g., an LPWAN satellite network). By communicating with the GNSS satellites, the endpoint device is able to determine one or more locations in the sky overhead that provide favorable (e.g., unobstructed) communication paths between the endpoint device and satellites in those locations. Then, using ephemeris data for both satellite constellations, the endpoint device determines a time when one or more satellites of the LPWAN satellite network will be in (or near to) one or more of those same locations. At the determined time, the endpoint device transmits data to be received by the one or more satellites of the LPWAN satellite network.

16 Claims, 5 Drawing Sheets

COMMUNICATION WITH MULTIPLE SATELLITE NETWORKS

BACKGROUND

A low-power wide-area network (LPWAN) is a type of wireless telecommunication wide area network designed to allow long-range communications at a low bit rate among connected devices, such as sensors operated on a battery. LPWAN devices may communicate with a satellite network to send and/or receive information in one or both of an uplink or a downlink direction.

BRIEF DESCRIPTION OF DRAWINGS

Various embodiments in accordance with the present disclosure will be described with reference to the drawings, in which.

DETAILED DESCRIPTION

The present disclosure relates to low-power wide-area networks (LPWANs), including satellite networks. According to some embodiments, an endpoint device in an LPWAN communicates with satellites in a Global Navigation Satellite System (GNSS) as well as with satellites in another satellite network (e.g., an LPWAN satellite network). By communicating with the GNSS satellites, the endpoint device is able to determine one or more locations in the sky overhead that provide favorable (e.g., unobstructed) communication paths between the endpoint device and satellites in those locations. Then, using ephemeris data for both satellite constellations, the endpoint device determines a time when one or more satellites of the LPWAN satellite network will be in (or near to) one or more of those same locations. At the determined time, the endpoint device transmits data to be received by the one or more satellites of the LPWAN satellite network.

An LPWAN is a type of wireless telecommunication wide area network designed to allow long-range communications at a low bit rate among connected devices, such as sensors operated on a battery. The low power, low bit rate, and intended use distinguish this type of network from a wireless WAN, which is designed to connect users or businesses, and carry more data, using more power. Typical LPWAN data rates range from 0.3 kbit/s to 50 kbit/s per channel. An LPWAN may be used to create a private wireless sensor network, but may also be a service or infrastructure offered by a third party, allowing the owners of sensors to deploy them in the field without investing in gateway technology.

Examples of LPWAN endpoint devices include sensors and trackers. For example, an LPWAN-connected sensor on an industrial machine may communicate information to the network about the machine's operating status, such as whether the machine needs maintenance. In another example, an LPWAN-connected tracker on a shipping container may communicate information to the network about the container's location and/or direction of movement.

LPWAN endpoint devices may communicate with their networks via ground-based links and/or via satellite links. For example, an LPWAN-connected tracker may communicate with a network of LPWAN satellites. Satellites in the LPWAN network may be in low Earth orbit (LEO), which is typically defined as an orbit around Earth with a period of 128 minutes or less (making at least 11.25 orbits per day) and an eccentricity less than 0.25. Satellites that are in LEO, or are in any type of orbit that is not geostationary, appear to a ground-based observer to be at different points in the sky at different times of the day (or night). That is, the satellites appear to move across the sky from the ground-based observer's point of view. Thus, for an LPWAN endpoint device on Earth, a direct communication path between the endpoint device and a satellite in the LPWAN network may be obstructed at certain times of the day as the satellite moves across the sky from the perspective of the endpoint device on Earth. Examples of obstructions that could be present in the communication path between the endpoint device and the satellite include, without limitation, hills, mountains, trees, buildings, or other man-made objects.

To efficiently transmit data from an LPWAN endpoint device on Earth to a satellite, it is advantageous to have an unobstructed communication path between the endpoint device and the satellite, as objects in the communication path attenuate the transmit signal from the endpoint device. Depending on the size and/or composition of any object(s) in the communication path, the signal attenuation may be such that the endpoint device must increase its transmit power in order for the signal to be received by the satellite, or the signal attenuation may be so severe that communication from the endpoint device to the satellite is impossible. Any increase in transmit power from the endpoint device increases the drain on the device's battery, which in turn shortens the usable lifespan of the endpoint device (at least until the drained battery can be recharged or replaced).

Thus, it is advantageous for the endpoint device to transmit data to the LPWAN satellite network at times when there is an unobstructed communication path between the endpoint device and one or more satellites in the LPWAN satellite constellation. Or, if a completely unobstructed communication path is impossible, it is at least advantageous for the endpoint device to transmit data to the satellite network at times when the communication path(s) is/are least obstructed. To determine these advantageous communication times, in some embodiments the endpoint device leverages satellite ephemeris data. For example, satellites in the LPWAN satellite constellation may transmit information about their location (e.g., current and predicted), timing, and health via what is known as ephemeris data. The ephemeris data is used according to some of the present embodiments to determine future satellite conditions (for a given place and time), providing a tool for planning when (or when not) to schedule data transmission from the endpoint device to the LPWAN satellite network.

A difficulty arises, though, when the endpoint device doesn't have reliable information about its current location and/or environmental conditions at its current location. For example, a sensor on a mobile machine, or a tracker on a shipping container, may experience varying environmental conditions as the machine and the shipping container move about. Without reliable information about current location and environmental conditions, the endpoint device can't determine advantageous times to transmit data to the LPWAN satellite network.

Another potential difficulty arises from directional characteristics of the endpoint device's antenna(s). For example, a PCB (printed circuit board) trace antenna has beam nulls in two opposite directions and stronger beams in the other directions. Thus, the orientation of the antenna can cause the antenna to have a stronger radio beam towards certain regions of the sky, making it more reliable to communicate with satellites as they pass through those same regions of the sky.

Some of the present embodiments solve these technical problems by leveraging information from a GNSS to determine the current location, and environmental conditions at that location, for the LPWAN endpoint device. The information obtained by communicating with the GNSS is then used to determine advantageous times to transmit data to the LPWAN satellite network. For example, the endpoint device receives ephemeris data for the GNSS, and ephemeris data for the LPWAN satellite constellation. The ephemeris data may be received from one or more satellites in each of the respective satellite constellations, and/or from one or more ground-based sources (e.g., via a connection to a WiFi network or a cellular network). In some embodiments, the LPWAN satellite ephemeris data may be preloaded onto the endpoint device when the endpoint device is manufactured. At an arbitrary time, the endpoint device attempts to receive data from the GNSS, and receives data from a subset of the satellites of the GNSS. This data, which may include time data that enables the endpoint device to synchronize its internal time with the time of the GNSS, enables the endpoint device to determine its current location. This data also enables the endpoint device to determine signal strengths of the satellites of the GNSS with which the endpoint device is able to communicate. Based on the signal strengths, it may be assumed that the strongest signals correspond to the least obstructed communication paths between the endpoint device and the respective satellites of the GNSS. In embodiments in which the endpoint device's antenna is not omnidirectional, it may also be assumed that the strongest signals correspond to directions from the antenna other than null directions. Based on one or both of these assumptions, and using the GNSS ephemeris data and the time data, the endpoint device determines position information for the satellites with which the endpoint device was able to communicate at the time when the endpoint device received the data from the subset of the satellites of the GNSS. Then, using the determined position information, and using the LPWAN satellite ephemeris data and the time data, the endpoint device determines a time when at least one satellite of the LPWAN satellite constellation will be in (or near to) a position to receive a transmission from the endpoint device. These positions correspond generally to the positions of the satellites of the GNSS from which the endpoint device received the strongest signals. Then, at the determined time, the endpoint device transmits data to the satellite(s) of the LPWAN satellite network.

Figure 1:
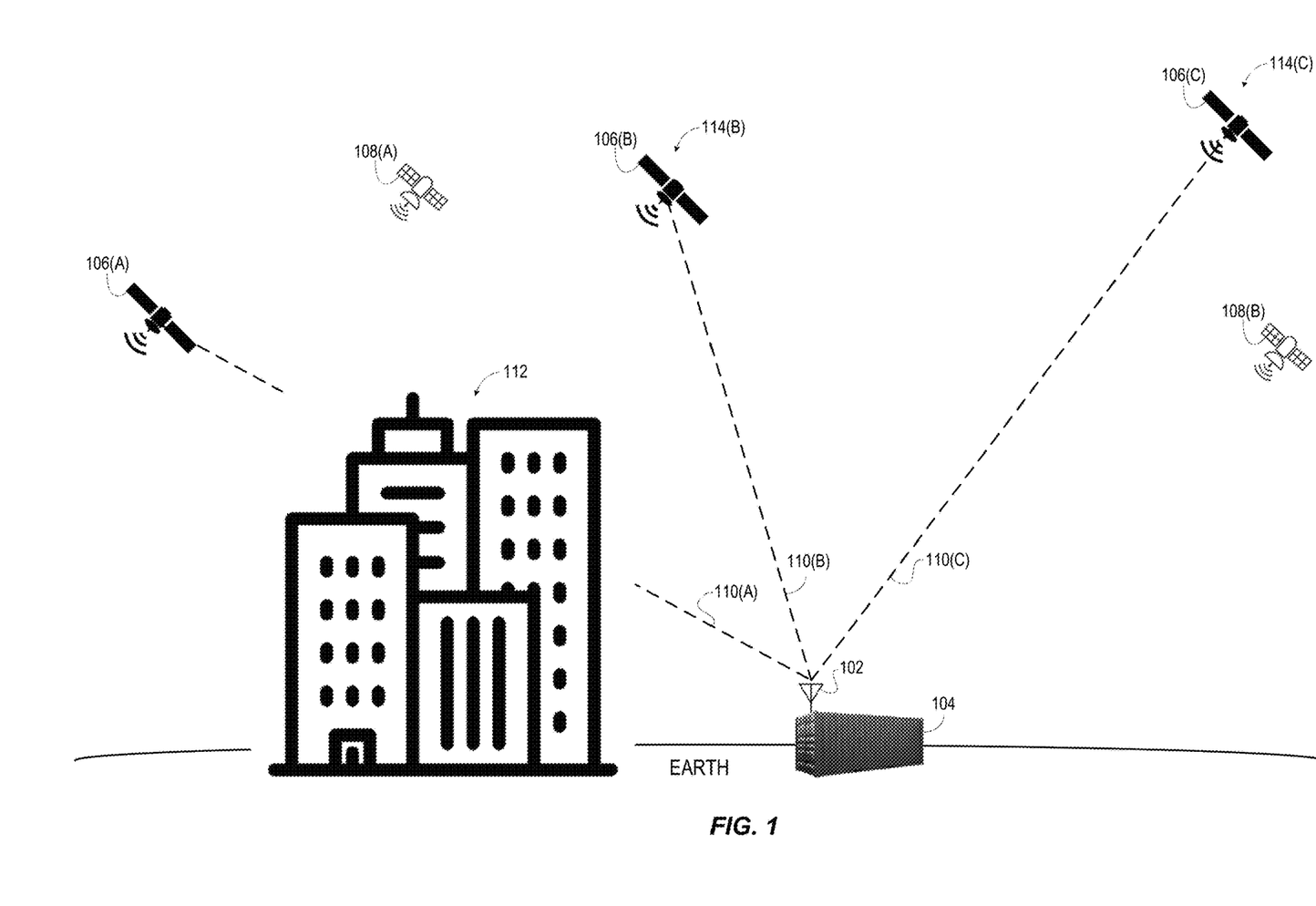
FIG. 1 is a schematic diagram illustrating communication between a wireless endpoint device on Earth and a first satellite network according to some embodiments.
Figure 2:
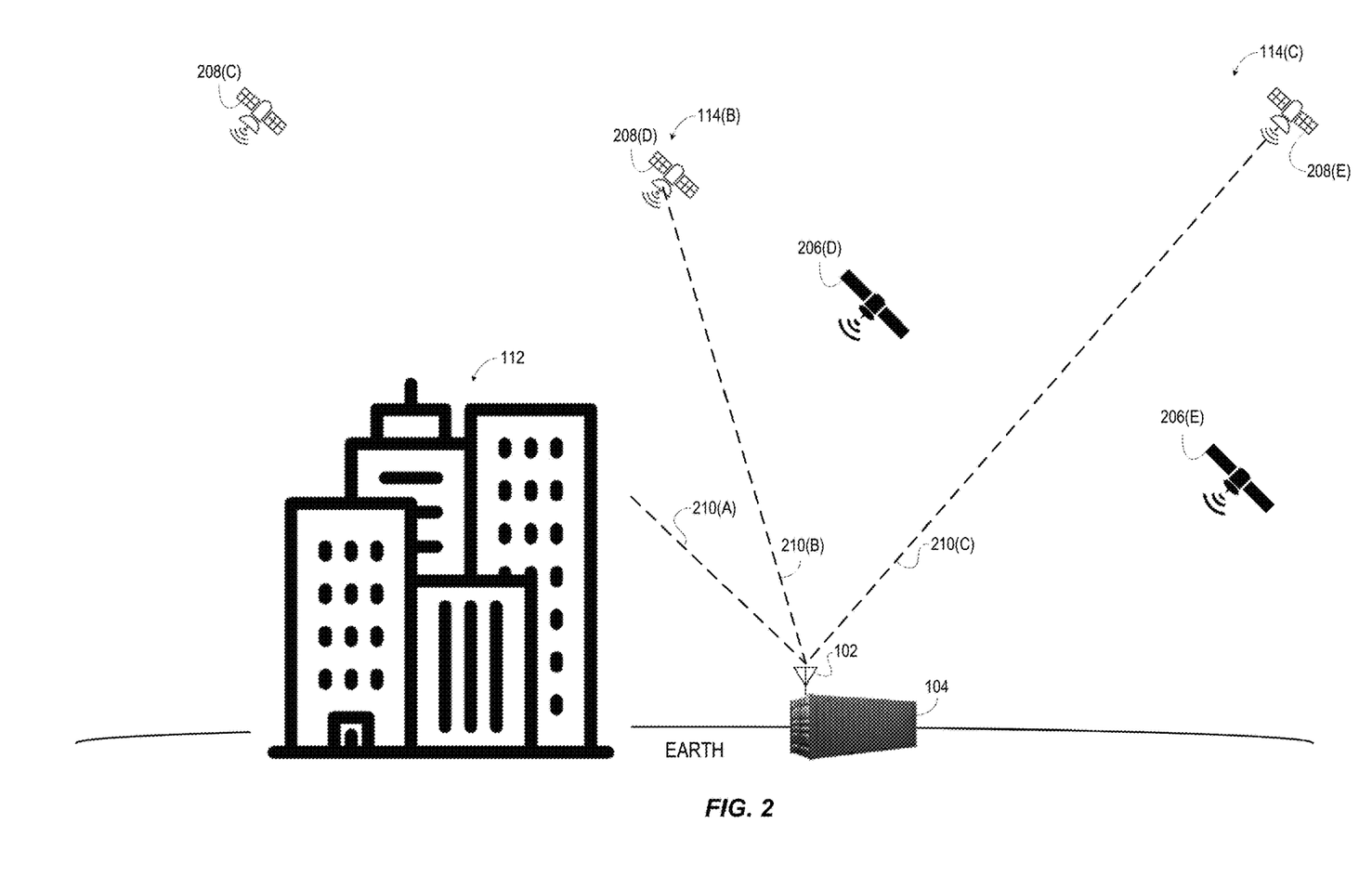
FIG. 2 is a schematic diagram illustrating communication between a wireless endpoint device on Earth and a second satellite network according to some embodiments.

FIGS. 1 and 2 illustrate communication between a wireless endpoint device on Earth and first and second satellite networks according to some embodiments. With reference to FIG. 1, an example endpoint device 102 is a tracker coupled with a shipping container 104 located on Earth. The endpoint device 102 receives data from satellites 106(A)-106(C) of a GNSS (also referred to herein as a first satellite network). Global Navigation Satellite Systems (GNSSs), such as the United States' GPS (Global Positioning System), the Russian GLONASS (Globalnaya Navigazionnaya Sputnikovaya Sistema), and the European Galileo system, provide autonomous geo-spatial positioning with global coverage. Ground-based receivers (e.g., the endpoint device 102) collect the signals from orbiting satellites to determine their location in three dimensions and calculate precise time. For example, the satellites may have at least one atomic clock aboard, which keep time very accurately (e.g., to within three billionths of a second), and which may be regularly corrected using even more accurate atomic clocks that are kept on the ground. The satellites are time-synchronized, because accurate time is the basis of GNSS location and navigation services. The GNSS satellites broadcast signals with their time and position over Earth. The GNSS receiver in a device on Earth compares the time signals it receives from the satellites with its internal clock. Knowing the speed of light and when the signals were sent and received, the device on Earth calculates its distance from each satellite, and thereby determines its longitude, latitude, and altitude.

FIG. 1 illustrates positions of a first GNSS satellite 106(A), a second GNSS satellite 106(B), and a third GNSS satellite 106(C), as well as positions of a first LPWAN satellite 108(A) and a second LPWAN satellite 108(B), at an arbitrary time. At the time shown in FIG. 1, the endpoint device 102 has an unobstructed communication path 110(B) to the second GNSS satellite 106(B) and an unobstructed communication path 110(C) to the third GNSS satellite 106(C), but the communication path 110(A) between the endpoint device 102 and the first GNSS satellite 106(A) is obstructed by buildings 112. Thus, at the time shown in FIG. 1, the endpoint device 102 receives data from the second and third GNSS satellites 106(B), 106(C) via the second and third communication paths 110(B), 110(C), but the endpoint device 102 does not receive data (or receives data very weakly) from the first GNSS satellite 106(A) via the first communication path 110(A) due to signal attenuation caused by the buildings 112. The data received from the second and third GNSS satellites 106(B), 106(C) enables the endpoint device 102 to determine its location on Earth. The data from the second and third GNSS satellites 106(B), 106(C) includes time data that enables the endpoint device 102 to synchronize its internal clock with the GNSS clock. The data received from the second and third GNSS satellites 106(B), 106(C) also enables the endpoint device 102 to determine signal strengths (e.g., in terms of dBm (decibels relative to a milliwatt)) of the signals from the second and third GNSS satellites 106(B), 106(C). For example, at the time shown in FIG. 1, the endpoint device 102 determines that the signals from the second and third GNSS satellites 106(B), 106(C) are strong, while the signal from the first GNSS satellite 106(A) is weak (or undetectable). The endpoint device 102 stores signal strength data for each of the GNSS satellites 106(A)-106(C) in local memory or storage. The endpoint device 102 uses the stored signal strength data to determine when to communicate with the second satellite network, as described below.

Using the data received from the GNSS satellites, and ephemeris data for the GNSS, the endpoint device 102 determines the positions of the second and third GNSS satellites 106(B), 106(C). GNSS satellites periodically transmit information about their positions (current and predicted), timing, and health via what is known as ephemeris data. This data is used by GNSS receivers on Earth to estimate their location relative to the satellites, and thus their location on Earth. The astronomical position calculated from ephemeris data is often given in the spherical polar coordinate system of right ascension and declination, together with the distance from the origin if applicable. Right ascension and declination are types of celestial coordinates that astronomers use to map the sky. They are similar to latitude and longitude coordinates that are used for locations on Earth. Right ascension (RA) is comparable to longitude, which measures east/west coordinates, while declination (Dec) is comparable to latitude, which measures north/south coordinates.

Like the GNSS satellites, the LPWAN satellites 108(A), 108(B) may also periodically transmit ephemeris data. The endpoint device 102 receives and stores the ephemeris data for both the GNSS and the LPWAN satellite constellations. For example, in some embodiments the endpoint device 102 receives the ephemeris data directly from satellites in each of the GNSS and the LPWAN satellite constellations. Alternatively, or in addition, the endpoint device 102 may receive the ephemeris data for either one, or both, of the GNSS and the LPWAN satellite constellations from one or more ground-based sources, such as via a connection to a WiFi network or a cellular network. For example, in some embodiments the endpoint device 102 may include one or both of a WiFi radio or a cellular radio for communicating with a WiFi network and/or a cellular network. Alternatively, or in addition, the endpoint device 102 may receive the ephemeris data for the LPWAN satellite constellation at the time the endpoint device 102 is manufactured. This technique may be advantageous for scenarios in which the satellites of the LPWAN satellite constellation use station keeping to keep the LPWAN satellites synchronized with the LPWAN ephemeris data, such that the endpoint device 102 never needs to receive updated LPWAN ephemeris data.

In some embodiments, the frequency with which the endpoint device 102 receives the ephemeris data for the LPWAN satellite constellation may be on the order of days or weeks, while in other embodiments the endpoint device 102 may receive the ephemeris data with greater frequency. In some embodiments, however, the LPWAN satellite constellation may use station keeping to keep the LPWAN satellites synchronized with the ephemeris data. In such embodiments, there is no need for the ephemeris data to be updated on the endpoint device 102. Once downloaded to the endpoint device 102, the ephemeris data is reliable for the lifetime(s) of the LPWAN satellite(s). Station keeping may be done in some embodiments using propulsion on the satellite(s) and/or differential drag maneuvers.

As described above, the endpoint device 102 determines the positions of the second and third GNSS satellites 106(B), 106(C) using the data received from the second and third GNSS satellites 106(B), 106(C) and the ephemeris data for the GNSS. The internal clock of the endpoint device 102, which may be updated periodically using data received from the GNSS, enables the endpoint device 102 to determine these positions by cross-referencing the time at which the data was received from the GNSS satellites with the ephemeris data for the GNSS. In particular, the ephemeris data indicates predicted future position information for the satellites in the GNSS constellation, and the position of a given GNSS satellite at a future time can therefore be determined using the ephemeris data. Thus, using the time at which the endpoint device 102 received the data from the second and third GNSS satellites 106(B), 106(C), the endpoint device 102 can determine the positions of the second and third GNSS satellites 106(B), 106(C) at that time using the ephemeris data for the GNSS. For ease of reference, the positions of the second and third GNSS satellites 106(B), 106(C) at the time at which the data was received from the GNSS satellites will be referred to below as the second position 114(B) and the third position 114(C), respectively, as shown in FIG. 1.

Using the second and third positions 114(B), 114(C), the internal clock of the endpoint device 102, and the ephemeris data for the LPWAN satellite constellation, the endpoint device 102 determines a future time when at least one satellite of the LPWAN satellite constellation will be at (or near) at least one of the second or third positions 114(B), 114(C). For example, FIG. 2 illustrates positions of a third LPWAN satellite 208(C), a fourth LPWAN satellite 208(D), and a fifth LPWAN satellite 208(E), as well as positions of a fourth GNSS satellite 206(D) and a fifth GNSS satellite 206(E), at the determined future time. At the time depicted in FIG. 2, the fourth LPWAN satellite 208(D) is in the second position 114(B) and the fifth LPWAN satellite 208 (E) is near the third position 114(C). The endpoint device 102 transmits data at the time depicted in FIG. 2, because it is expected that conditions are favorable at that time for the data transmitted by the endpoint device 102 to be received at the fourth and fifth LPWAN satellites 208(D), 208(E) due to the strong signals received by the endpoint device 102 from the second and third GNSS satellites 106(B), 106(C) at the earlier time (FIG. 1) when the second and third GNSS satellites 106(B), 106(C) were at the second and third positions 114(B), 114(C), respectively. The data transmitted by the endpoint device 102 at the time depicted in FIG. 2 may not be received, or may be received very weakly, at the third LPWAN satellite 208(C) due to signal attenuation in the communication path 210(A) caused by the buildings 112.

In some embodiments, a satellite may be considered to be in the same position as another satellite if both satellites have the same right ascension and declination, even if the satellites are at different altitudes (distances from Earth). For example, satellites of the LPWAN satellite constellation may occupy a higher altitude in comparison to satellites of the GNSS constellation. Nevertheless, the fourth LPWAN satellite 208(D) may be considered to be in the second position 114(B) at the time depicted in FIG. 2 because the fourth LPWAN satellite 208(D) has the same right ascension and declination as the second GNSS satellite 106(B) had at the time depicted in FIG. 1.

In some embodiments, a second satellite may be considered to be in the same position as a first satellite if the second satellite is within a nearness tolerance of the position of the first satellite. For example, in some embodiments the endpoint device 102 may transmit if a direction of an LPWAN satellite 108 is within N degrees from the direction of a previously received transmission from a GNSS satellite 106. In various embodiments, the value of N may be $\pm 1°$, or $\pm 2°$, or $\pm 3°$, or $\pm 4°$, or $\pm 5°$, or $\pm 10°$, or $\pm 15°$, or any other value. In some embodiments, the value of N may be a tunable parameter. For example, the value of N could be tuned based on one or more of (1) the diversity and quantity of the directions of transmissions from GNSS satellites 106 the endpoint device 102 has received, (2) the urgency of a message the endpoint device 102 is waiting to send, or (3) the cost of transmitting a message from the endpoint device 102 (where the cost may be measured by the power needed to send the message). In one non-limiting example, if there are many available directions to transmit (as determined by having received many transmissions from GNSS satellites 106 in many different directions from the endpoint device 102), and/or the cost of transmitting is high, and/or the urgency is low, then the value of N may be low so that the endpoint device 102 will wait for a good opportunity to send the message so that the likelihood of a successful reception of that message by at least one LPWAN satellite 108 is high. Conversely, if the urgency is high, and the cost of transmitting is low, then the value of N may be high so that the message has a chance to be received in a timely manner, even if the likelihood of a successful reception of that message by at least one LPWAN satellite 108 is low.

In some embodiments, the endpoint device 102 may build up a model of the view of the sky. For example, as the GNSS tracks across the sky with a lock maintained for multiple discrete receptions, it can be inferred that the directions in between the discrete reception points are likely also unobstructed. Further, if the model includes 10's or even 100's of GNSS reception directions, a clustering algorithm may be used to infer connected areas of clear sky view, and it can be assumed that the rest of the sky is blocked.

Figure 3:
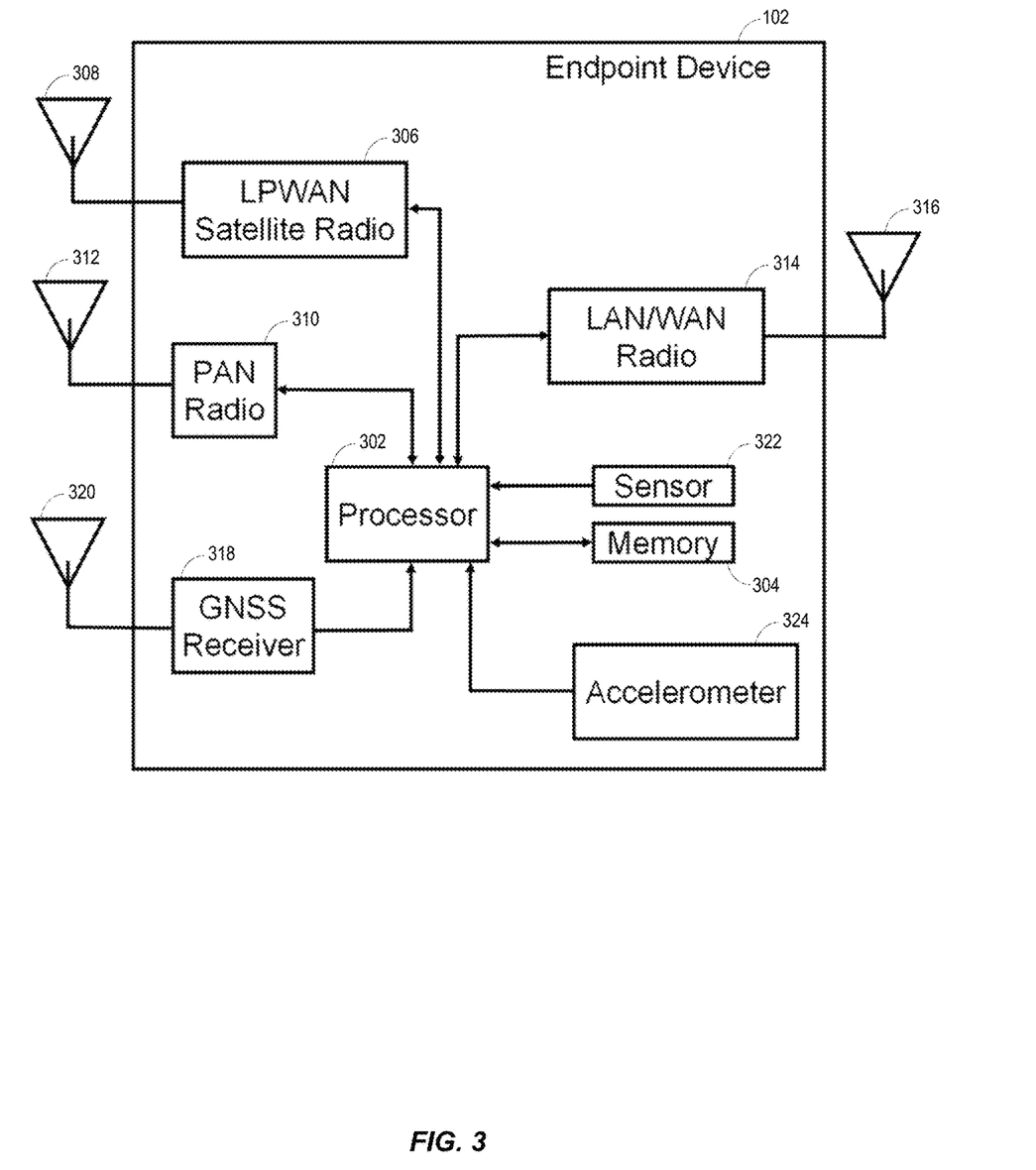
FIG. 3 is a functional block diagram illustrating a wireless endpoint device according to some embodiments.

FIG. 3 illustrates an example endpoint device 102 according to some embodiments. The endpoint device 102, which may comprise a sensor and/or a tracker, includes at least one processor 302 and memory 304. The processor(s) 302 can be any suitable processor(s) capable of executing instructions. For example, in various examples, the processor(s) 302 can be general-purpose or embedded processors implementing any of a variety of instruction set architectures (ISAs), such as the x86, ARM, PowerPC, SPARC, or MIPS ISAs, or any other suitable ISA. In multiprocessor 302 systems, each of the processors 302 can commonly, but not necessarily, implement the same ISA. The memory 304 can store instructions and data accessible by the processor(s) 302. In various examples, the memory 304 can be implemented using any suitable memory technology, such as random-access memory (RAM), static RAM (SRAM), synchronous dynamic RAM (SDRAM), nonvolatile/Flash-type memory, or any other type of memory. In various embodiments, the memory 304 stores instructions executable by the processor(s) 302 to perform aspects of the methods described herein, including without limitation the methods described with respect to FIGS. 4 and 5.

The endpoint device 102 further includes one or more radios and one or more receivers, each of which is communicatively coupled with the processor 302, and each of which includes a corresponding antenna. For example, the illustrated embodiment of the endpoint device 102 includes an LPWAN satellite radio 306 and a corresponding LPWAN satellite radio antenna 308 that enable the endpoint device 102 to communicate wirelessly with the LPWAN satellite network. The illustrated embodiment of the endpoint device 102 further includes a PAN (personal area network) radio 310 and a corresponding PAN radio antenna 312 that enable the endpoint device 102 to communicate wirelessly with a PAN using, for example, Bluetooth or BLE (Bluetooth Low Energy) technology. The illustrated embodiment of the endpoint device 102 further includes a LAN/WAN (local area network/wide area network) radio and a corresponding LAN/WAN radio antenna 316 that enable the endpoint device 102 to communicate wirelessly with a LAN and/or a WAN, such as, for example, a WiFi network or a cellular network. The illustrated embodiment of the endpoint device 102 further includes a GNSS receiver 318 and a corresponding GNSS receiver antenna 320 that enable the endpoint device 102 to receive wireless transmissions from the GNSS. Any of the radios 306, 310, 314 may include a transmitter and a receiver (or a transceiver) that enable two-way communication with the respective networks. In alternative embodiments, one or more of the illustrated radios/antennas may be omitted, such as the LAN/WAN radio 314 and corresponding antenna 316 and/or the PAN radio 310 and corresponding antenna 312. In some embodiments, one or more of the radios 306, 310, 314 may be combined into a single radio that can communicate over multiple networks. For example, in some embodiments the LPWAN satellite radio 306 may be combined with the PAN radio 310.

In some embodiments, one or more of the antennas 308, 312, 316, 320 may be omnidirectional, while in some embodiments one or more of the antennas 308, 312, 316, 320 may have directional characteristics. For example, the LPWAN satellite radio antenna 308 and the GNSS receiver antenna 320 may have respective radiation patterns with one or more lobes or beams. In such embodiments, it is advantageous for the LPWAN satellite radio antenna 308 to be designed and oriented such that its radiation pattern is similar to (and is oriented similarly to) the radiation pattern of the GNSS receiver antenna 320. When the radiation patterns of these two antennas are similar, and are similarly oriented, then the directional characteristics of the antennas should not impact the determination of the time when the satellites of the LPWAN satellite network will be in position to receive transmissions from the endpoint device 102. That is, when the endpoint device 102 receives data from the subset of satellites of the GNSS and determines respective signal strengths for the satellites in the subset, it can be assumed that the positions of the satellites in the subset that have strong signals will also provide strong signals from the satellites of the LPWAN satellite network when those satellites are in those same positions, because the lobes of the LPWAN satellite radio antenna 308 point in similar directions to the lobes of the GNSS receiver antenna 320. While similar radiation patterns for the LPWAN satellite radio antenna 308 and the GNSS receiver antenna 320 provide this advantage, it is not necessary for these two antennas to be similarly designed and oriented, as any differences in the radiation patterns between the two antennas may be accounted for in the determination of the time when the satellites of the LPWAN satellite network will be in position to receive transmissions from the endpoint device 102.

With reference to FIG. 3, the illustrated embodiment of the endpoint device 102 further includes a sensor 322 and an accelerometer 324, each of which is communicatively coupled with the processor 302. As discussed above, the endpoint device 102 may provide sensing functionality, and in various embodiments the onboard sensor 322 may be configured to sense any of a variety of conditions. For example, in non-limiting examples, the sensor 322 may sense ambient temperature or humidity, or detect the presence and/or concentration of gaseous substances (e.g., CO, $CO_2$, $O_2$, etc.) or particulate matter (e.g., dust, dirt, soot, smoke, etc.). In other non-limiting examples, the sensor 322 may monitor equipment, such as event counting, or sensing fuel level, battery charge, system health, noise level, etc. In another non-limiting example, the sensor 322 may monitor seismic activity. In embodiments in which the endpoint device 102 is a tracker, the sensor 322 may be omitted. The accelerometer 324 may be used to determine the orientation of the endpoint device 102, which may facilitate determination of the time when the satellites of the LPWAN satellite network will be in position to receive transmissions from the endpoint device 102, particularly in embodiments in which the radiation patterns for the LPWAN satellite radio antenna 308 and the GNSS receiver antenna 320 are dissimilar. In various embodiments, the accelerometer 324 may be omitted.

Figure 4:
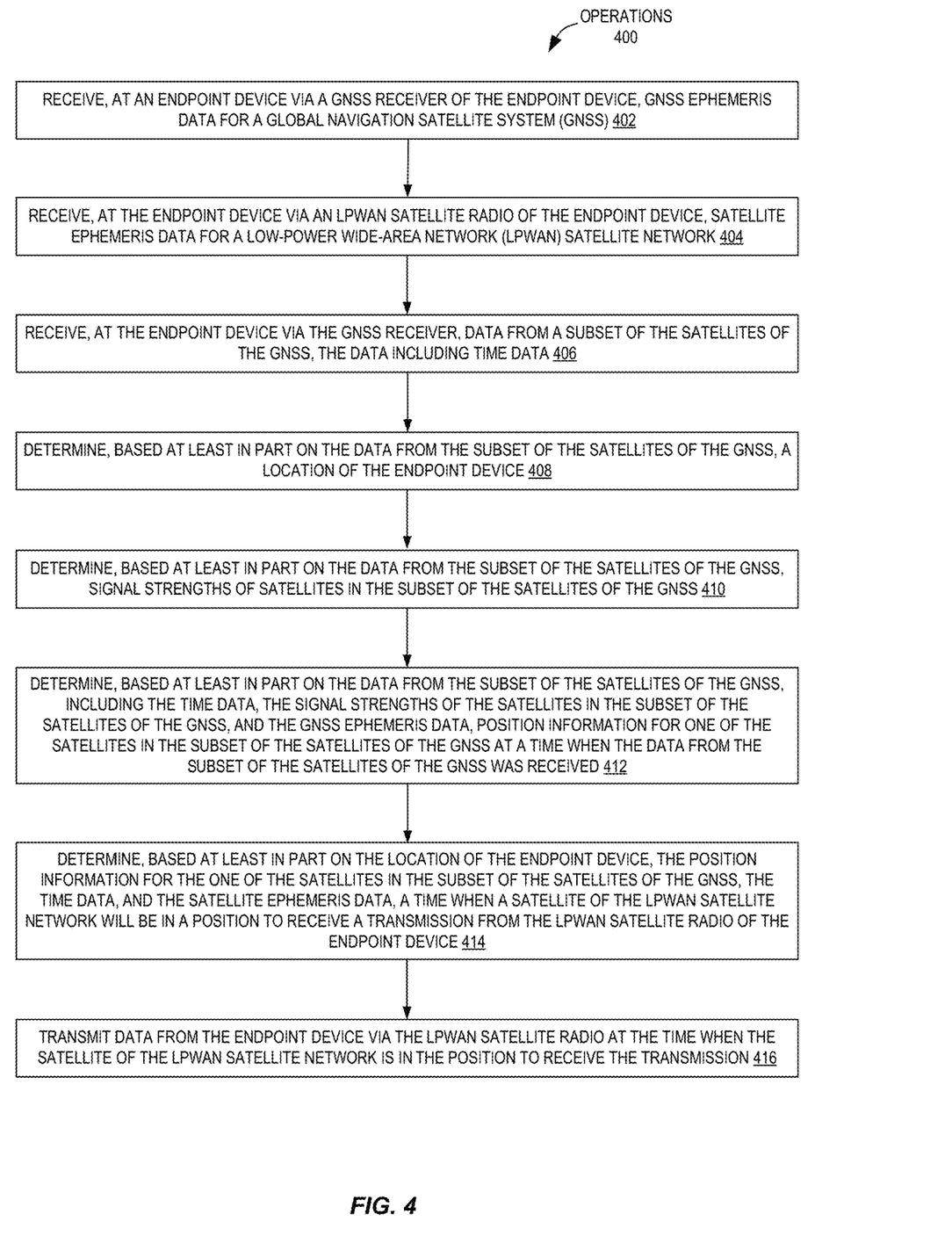
FIG. 4 is a flow diagram illustrating operations of a method for communicating with multiple satellite networks according to some embodiments.

FIG. 4 is a flow diagram illustrating operations 400 of a method for communicating with multiple satellite networks according to some examples. Some or all of the operations 400 (or other processes described herein, or variations, and/or combinations thereof) are performed under the control of one or more computer systems (e.g., the endpoint device 102) configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 400 are performed by the endpoint device 102 of the other figures.

The operations 400 include, at block 402, receiving, at an endpoint device via a GNSS receiver of the endpoint device, GNSS ephemeris data for a Global Navigation Satellite System (GNSS). For example, the endpoint device 102 of FIG. 3 may receive the GNSS ephemeris data from one or more satellites of the GNSS constellation via the GNSS receiver 318 and the GNSS receiver antenna 320. Alternatively, or in addition, the endpoint device 102 may receive the GNSS ephemeris data from one or more ground-based networks via one or more of the LAN/WAN radio 314 and the LAN/WAN radio antenna 316, or the PAN radio 310 and the PAN radio antenna 312. In some embodiments, the processor 302 of the endpoint device 102 may store the received GNSS ephemeris data at the memory 304 or other local storage (not shown).

The operations 400 further include, at block 404, receiving, at the endpoint device via an LPWAN satellite radio of the endpoint device, satellite ephemeris data for a low-power wide-area network (LPWAN) satellite network. For example, the endpoint device 102 of FIG. 3 may receive the satellite ephemeris data from one or more satellites of the LPWAN constellation via the LPWAN receiver and the LPWAN receiver antenna. Alternatively, or in addition, the endpoint device 102 may receive the LPWAN ephemeris data from one or more ground-based networks via one or more of the LAN/WAN radio 314 and the LAN/WAN radio antenna 316, or the PAN radio 310 and the PAN radio antenna 312. In some embodiments, the processor 302 of the endpoint device 102 may store the received satellite ephemeris data at the memory 304 or other local storage (not shown).

The operations 400 further include, at block 406, receiving, at the endpoint device via the GNSS receiver, data from a subset of the satellites of the GNSS, the data including time data. For example, the endpoint device 102 of FIG. 3 may periodically power up the GNSS receiver 318 to receive, via the GNSS receiver 318 and the GNSS receiver antenna 320, the data from one or more satellites of the GNSS constellation. The endpoint device 102 may receive the data from any satellites of the GNSS constellation for which there is an unobstructed or partially obstructed communication path, as shown in FIG. 1. The received data may be passed to the processor 302 and stored at the memory 304.

The operations 400 further include, at block 408, determining, based at least in part on the data from the subset of the satellites of the GNSS, a location of the endpoint device. For example, the endpoint device 102 on Earth may compare the time signals it receives from the GNSS satellites with its internal clock. Knowing the speed of light and when the signals were sent and received, the endpoint device 102 on Earth calculates its distance from each satellite, and thereby determines its longitude, latitude, and altitude.

In some embodiments, the location of the endpoint device 102 may be static, because the endpoint device 102 is coupled to a stationary object, such as an appliance in a home or office, or a piece of heavy machinery in a factory. In such embodiments, the location of the endpoint device 102 may be programmed during provisioning of the endpoint device 102, and need not be updated periodically. Thus, in some embodiments, block 408 may be omitted from some performances of the operations 400. Also in such embodiments, the location of the endpoint device 102 may be determined through techniques other than via communication with a GNSS. For example, the location of the endpoint device 102, such as a physical address, could be provided by a user during setup of the endpoint device 102. Also in some embodiments, a very accurate oscillator of the endpoint device 102 may be capable of maintaining accurate time to within minutes over the course of a few years, which may be advantageous if GNSS time is not available from the onboard GNSS receiver 318, or if time can't be obtained in any other way.

The operations 400 further include, at block 410, determining, based at least in part on the data from the subset of the satellites of the GNSS, signal strengths of satellites in the subset of the satellites of the GNSS. For example, the data received from the subset of the satellites of the GNSS may enable the endpoint device 102 to determine signal strengths (e.g., in terms of dBm (decibels relative to a milliwatt)) of the signals from the GNSS satellites. In some embodiments, these signal strengths may be stored at the memory 304.

The operations 400 further include, at block 412, determining, based at least in part on the data from the subset of the satellites of the GNSS, including the time data, the signal strengths of the satellites in the subset of the satellites of the GNSS, and the GNSS ephemeris data, position information for one of the satellites in the subset of the satellites of the GNSS at a time when the data from the subset of the satellites of the GNSS was received. For example, the processor 302 of the endpoint device 102 may use the data received from the subset of the satellites of the GNSS to determine which satellites of the GNSS constellation (the subset of the satellites of the GNSS) transmitted the data that the endpoint device 102 received. For example, the received data may include one or more identifiers of the satellites of the GNSS constellation in the subset. Then, using the GNSS ephemeris data and time data, the processor 302 may determine the positions of those satellites at the time the endpoint device 102 received the data. The time data may be received with other data from the subset of satellites, and/or the time data may be acquired from an internal clock of the endpoint device 102. The determined positions of the satellites in the subset may be stored at the memory 304, in some embodiments.

The operations 400 further include, at block 414, determining, based at least in part on the location of the endpoint device, the position information for the one of the satellites in the subset of the satellites of the GNSS, the time data, and the satellite ephemeris data, a time when a satellite of the LPWAN satellite network will be in a position to receive a transmission from the LPWAN satellite radio of the endpoint device. For example, the processor 302 of the endpoint device 102 may combine the location of the endpoint device 102, the position information for the GNSS satellite, the time data, and the satellite ephemeris data, to determine a time at which a satellite of the LPWAN satellite constellation will be passing through the region of the sky that corresponds to the location of one of the GNSS satellites from which the data was received at block 406, and which GNSS satellite was determined to have good signal strength.

The operations 400 further include, at block 416, transmitting data from the endpoint device via the LPWAN satellite radio at the time when the satellite of the LPWAN satellite network is in the position to receive the transmission. For example, the endpoint device 102 may wait until the time determined at block 414, and then transmit data (e.g., one or more packets) to be received by the satellite of the LPWAN satellite network (and possibly one or more other satellites of the LPWAN satellite network). The satellite(s) of the LPWAN satellite network that receive the data transmitted from the endpoint device 102 may transmit that data to one or more ground stations, which may in turn transmit the data to a backend computer system via one or more networks.

In some embodiments, since the GNSS receiver 318 outputs a received signal strength for the GNSS satellites from which it receives data, the path loss between the endpoint device 102 and the GNSS satellite(s) can also be determined. This path loss can be extrapolated, in some embodiments, into a path loss between the endpoint device 102 and the LPWAN satellite that will be passing through the region of the sky that corresponds to the location of one of the GNSS satellites from which the data was received at block 406. The extrapolation may comprise adjusting for the difference in altitude between the GNSS satellite and the LPWAN satellite. If there is correlation between the GNSS receiver antenna 320 radiation pattern and the LPWAN satellite radio antenna 308 radiation pattern, then the LPWAN satellite radio 306 can adjust (e.g., reduce) its transmit power to the proper level for reliable communication with the LPWAN satellite. This technique can advantageously reduce the power consumption of the LPWAN satellite radio 306 by avoiding any need to transmit at full power for every transmission to the LPWAN satellite network.

Figure 5:
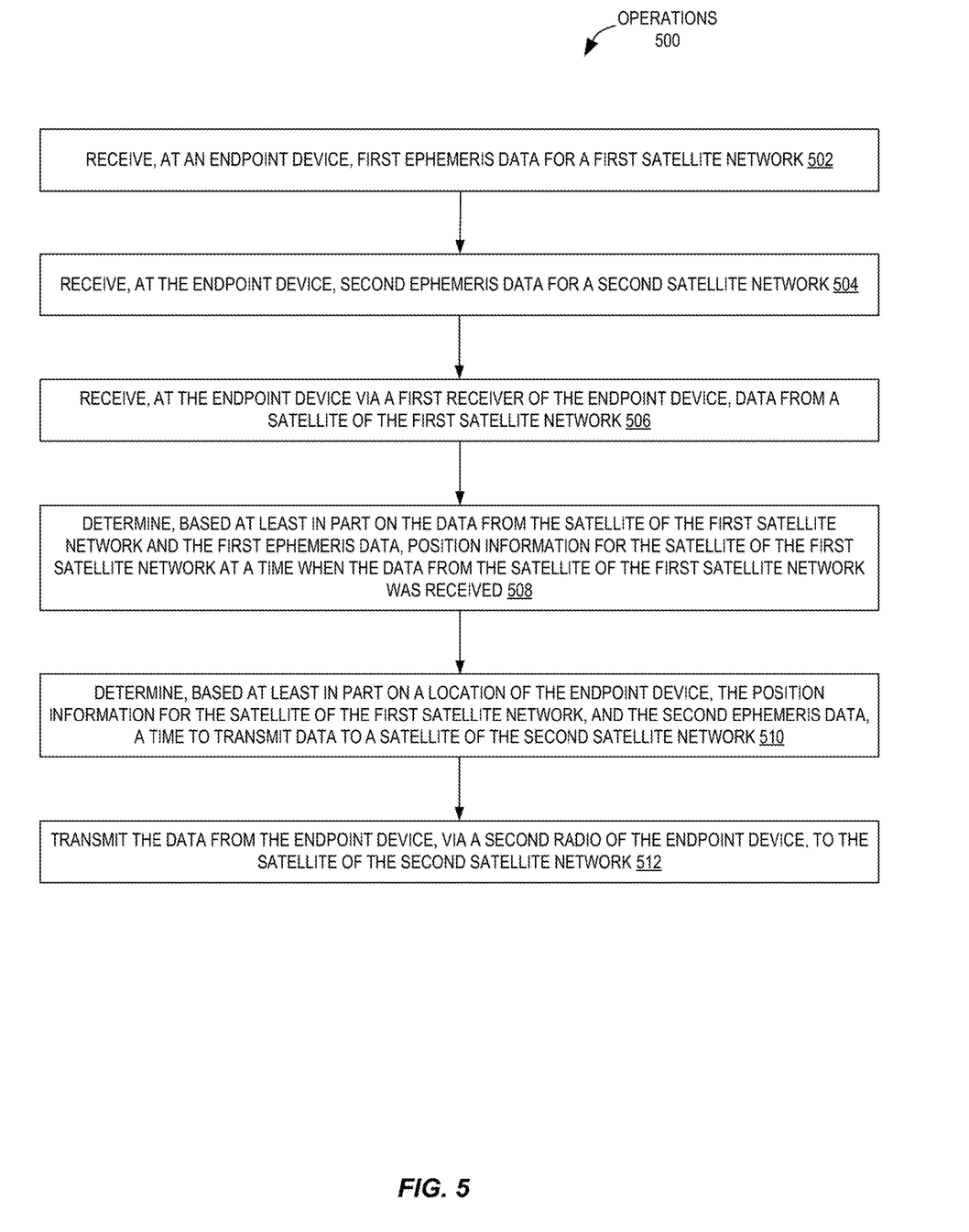
FIG. 5 is a flow diagram illustrating operations of another method for communicating with multiple satellite networks according to some embodiments.

FIG. 5 is a flow diagram illustrating operations 500 of another method for communicating with multiple satellite networks according to some examples. Some or all of the operations 500 (or other processes described herein, or variations, and/or combinations thereof) are performed under the control of one or more computer systems (e.g., the endpoint device 102) configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by the endpoint device 102 of the other figures.

The operations 500 include, at block 502, receiving, at an endpoint device, first ephemeris data for a first satellite network. For example, in some embodiments the first satellite network may comprise the GNSS, and the endpoint device 102 of FIG. 3 may receive the GNSS ephemeris data from one or more satellites of the GNSS constellation via the GNSS receiver 318 and the GNSS receiver antenna 320. Alternatively, or in addition, the endpoint device 102 may receive the GNSS ephemeris data from one or more ground-based networks via one or more of the LAN/WAN radio 314 and the LAN/WAN radio antenna 316, or the PAN radio 310 and the PAN radio antenna 312. In some embodiments, the processor 302 of the endpoint device 102 may store the received GNSS ephemeris data at the memory 304 or other local storage (not shown).

The operations 500 further include, at block 504, receiving, at the endpoint device, second ephemeris data for a second satellite network. For example, in some embodiments the second satellite network may comprise the LPWAN satellite network, and the endpoint device 102 of FIG. 3 may receive the satellite ephemeris data from one or more satellites of the LPWAN constellation via the LPWAN receiver and the LPWAN receiver antenna. Alternatively, or in addition, the endpoint device 102 may receive the LPWAN ephemeris data from one or more ground-based networks via one or more of the LAN/WAN radio 314 and the LAN/WAN radio antenna 316, or the PAN radio 310 and the PAN radio antenna 312. In some embodiments, the processor 302 of the endpoint device 102 may store the received satellite ephemeris data at the memory 304 or other local storage (not shown).

The operations 500 further include, at block 506, receiving, at the endpoint device via a first receiver of the endpoint device, data from a satellite of the first satellite network. For example, the endpoint device 102 of FIG. 3 may periodically power up the GNSS receiver 318 to receive, via the GNSS receiver 318 and the GNSS receiver antenna 320, the data from one or more satellites of the GNSS constellation. The endpoint device 102 may receive the data from any satellites of the GNSS constellation for which there is an unobstructed or partially obstructed communication path, as shown in FIG. 1. The received data may be passed to the processor 302 and stored at the memory 304.

The operations 500 further include, at block 508, determining, based at least in part on the data from the satellite of the first satellite network and the first ephemeris data, position information for the satellite of the first satellite network at a time when the data from the satellite of the first satellite network was received. For example, the processor 302 of the endpoint device 102 may use the data received from the satellite of the GNSS to determine which satellite of the GNSS constellation transmitted the data that the endpoint device 102 received. For example, the received data may include an identifier of the satellite of the GNSS constellation. Then, using the GNSS ephemeris data and time data, the processor 302 may determine the position of the satellite at the time the endpoint device 102 received the data. The time data may be received with other data from the satellite, and/or the time data may be acquired from an internal clock of the endpoint device 102. The determined position of the satellite may be stored at the memory 304, in some embodiments.

The operations 500 further include, at block 510, determining, based at least in part on a location of the endpoint device, the position information for the satellite of the first satellite network, and the second ephemeris data, a time to transmit data to a satellite of the second satellite network. For example, the processor 302 of the endpoint device 102 may combine the location of the endpoint device 102, the position information for the GNSS satellite, the time data, and the satellite ephemeris data, to determine a time at which a satellite of the LPWAN satellite constellation will be passing through the region of the sky that corresponds to the location of the GNSS satellite from which the data was received at block 506.

The operations 500 further include, at block 512, transmitting the data from the endpoint device, via a second radio of the endpoint device, to the satellite of the second satellite network. For example, the endpoint device 102 may wait until the time determined at block 510, and then transmit data (e.g., one or more packets) to be received by the satellite of the LPWAN satellite network (and possibly one or more other satellites of the LPWAN satellite network). The satellite(s) of the LPWAN satellite network that receive the data transmitted from the endpoint device 102 may transmit that data to one or more ground stations, which may in turn transmit the data to a backend computer system via one or more networks.

In some embodiments, at least some of the aspects described above may be combined with a mesh network for use cases in which one or more endpoint devices (e.g., nodes) in the mesh network are prevented from communicating with satellites due to obstructions in the communication paths between the endpoint devices and the satellites. For example, in certain use cases, such as tracking of shipping containers, assets to be tracked are stacked on top of each other, potentially blocking an endpoint device that may be affixed to a container at the bottom of the stack from communicating with any satellites. In another use case, endpoint devices may be indoors, and one or more such endpoint devices may be located close to a window so that they can transmit data through the window to reach LPWAN satellites, while endpoint devices farther away from the window are blocked from communicating with the LPWAN satellites. Some of the present embodiments solve these problems by creating a mesh network among the endpoint devices, where each endpoint device is a node in the mesh network. Then, it is determined which nodes in the network are able to communicate with satellites, and which node(s) in the network are not able to communicate with satellites. Those nodes that are not able to communicate with satellites transmit their data to one or more other nodes that are able to communicate with satellites, and those nodes further transmit the data to the satellites (along with their own data).

In some embodiments, the endpoint device includes a PAN (e.g., BLE) chip with mesh firmware and an LPWAN satellite radio stack. Alternatively, the endpoint device may include a separate LPWAN satellite radio that is independent of the PAN chip. The endpoint device further includes a GNSS receiver, and may also include a LAN/WAN (e.g., cellular, WiFi, etc.) radio and/or other radios.

When multiple endpoint devices are aggregated, such as in the shipping container use case described above, the PAN chips of the endpoint devices form a mesh network. Each endpoint device may check periodically to determine whether it can receive wireless signals from any GNSS satellites. For endpoint devices that can receive wireless signals from GNSS satellites, those endpoint devices use the techniques described above (e.g., with reference to FIGS. 4 and 5) to determine when LPWAN satellites will pass through regions of the sky that have unobstructed (or only partially obstructed) communication paths from the endpoint device, and the approximate signal strength(s) from the LPWAN satellite at that time and position. This information is shared among the endpoint devices in the mesh network.

The endpoint device in the mesh network that determines it will have the strongest signal strength from the LPWAN satellite(s) that is determined to pass through regions of the sky that have unobstructed (or only partially obstructed) communication paths from the endpoint device aggregates data (e.g., messages) from other endpoint devices in the mesh network and forwards the data to the LPWAN satellite network. If multiple endpoints are determined to have clear communication paths to one or more LPWAN satellites, then a subset of the endpoints that have clear communication paths may be used to transmit the data from the endpoint devices that don't have clear communication paths to the LPWAN satellites.

In some embodiments, information regarding which GNSS satellites are observable by the endpoint device can be leveraged to provide information to a user about the state of the asset to which the endpoint device is coupled. For example, if a shipping container is typically on top of a stack of containers, but then has other containers stacked on top of it, the other containers may block the ability of the endpoint device to receive communications from GNSS satellites. Information about the endpoint device transitioning from being able to receive communications from GNSS satellites to no longer being able to receive communications from GNSS satellites may be communicated to a user, and the user may deduce from that information that the shipping container is no longer on the top of the stack of shipping containers.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 106(A)-106(C)) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean any of A, B, or C, or any combination thereof (e.g., A, B, and/or C). Similarly, language such as "at least one or more of A, B, and C" (or "one or more of A, B, and C") is intended to be understood to mean any of A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. This term does not foreclose additional factors that may affect a determination or action. For example, a determination may be solely based on the factor(s) listed or based on the factor(s) and one or more additional factors. Thus, if an action A is "based on" B, then B is one factor that affects action A, but this does not foreclose the action A from also being based on one or more other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (meaning having the potential to), rather than the mandatory sense (meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
  receiving, at an endpoint device via a GNSS receiver of the endpoint device, GNSS ephemeris data for a Global Navigation Satellite System (GNSS);
  receiving, at the endpoint device via an LPWAN satellite radio of the endpoint device, satellite ephemeris data for a low-power wide-area network (LPWAN) satellite network;
  receiving, at the endpoint device via the GNSS receiver, first data from a subset of the satellites of the GNSS, the first data including time data;
  determining, based at least on the first data from the subset of the satellites of the GNSS, a location of the endpoint device;
  determining, based at least on the first data from the subset of the satellites of the GNSS, signal strengths of satellites in the subset of the satellites of the GNSS;
  determining, based at least on the first data from the subset of the satellites of the GNSS, including the time data, the signal strengths of the satellites in the subset of the satellites of the GNSS, and the GNSS ephemeris data, position information for one of the satellites in the subset of the satellites of the GNSS at a time when the first data from the subset of the satellites of the GNSS was received;
  determining, based at least on the location of the endpoint device, the position information for the one of the satellites in the subset of the satellites of the GNSS, the time data, and the satellite ephemeris data, a time when a satellite of the LPWAN satellite network will be in a position to receive a transmission from the LPWAN satellite radio of the endpoint device; and
  transmitting second data from the endpoint device via the LPWAN satellite radio at the time when the satellite of the LPWAN satellite network is in the position to receive the transmission.

2. The computer-implemented method of claim 1, wherein determining the time when the satellite of the LPWAN satellite network will be in the position to receive the transmission from the LPWAN satellite radio of the endpoint device is further based at least on directional characteristics of an antenna of the endpoint device.

3. The computer-implemented method of claim 1, further comprising determining, based at least on the signal strengths of the satellites in the subset of the satellites of the GNSS, a path loss between the endpoint device and the one of the satellites in the subset of the satellites of the GNSS.

4. An endpoint device comprising:
  at least one processor; and
  memory storing instructions that, when executed by the at least one processor, cause the endpoint device to:
    receive GNSS ephemeris data for a Global Navigation Satellite System (GNSS);
    receive, via an LPWAN satellite radio of the endpoint device, satellite ephemeris data for a low-power wide-area network (LPWAN) satellite network;
    receive, via a GNSS receiver of the endpoint device, first data from a satellite of the GNSS, the first data including time data;
    determine, based at least on the first data from the satellite of the GNSS, a location of the endpoint device;
    determine, based at least on the first data from the satellite of the GNSS, a signal strength of the satellite of the GNSS;
    determine, based at least on the first data from the satellite of the GNSS, including the time data, the signal strength of the satellite of the GNSS, and the GNSS ephemeris data, position information for the satellite of the GNSS at a time when the first data from the satellite of the GNSS was received;
    determine, based at least on the location of the endpoint device, the position information for the satellite of the GNSS, the time data, and the satellite ephemeris data, a time when a satellite of the LPWAN satellite network will be in a position to receive a transmission from the LPWAN satellite radio of the endpoint device; and
    transmit second data via the LPWAN satellite radio at the time when the satellite of the LPWAN satellite network is in the position to receive the transmission.

5. The endpoint device of claim 4, wherein determining the time when the satellite of the LPWAN satellite network will be in a position to receive a transmission from the LPWAN satellite radio of the endpoint device is further based at least on directional characteristics of an antenna of the endpoint device.

6. The endpoint device of claim 4, wherein the instructions comprise further instructions that, when executed by the at least one processor, further cause the endpoint device to determine, based at least on the signal strength of the satellite of the GNSS, a path loss between the endpoint device and the satellite of the GNSS.

7. The endpoint device of claim 6, wherein the instructions comprise further instructions that, when executed by the at least one processor, further cause the endpoint device to estimate, based at least on the path loss between the endpoint device and the satellite of the GNSS, and based at least on a difference in altitude between the satellite of the GNSS and the satellite of the LPWAN satellite network, a path loss between the endpoint device and the satellite of the LPWAN satellite network.

8. The endpoint device of claim 7, wherein the instructions comprise further instructions that, when executed by the at least one processor, further cause the endpoint device to adjust, prior to transmitting the second data from the endpoint device to the satellite of the LPWAN satellite network, a transmit power of the LPWAN radio of the endpoint device based at least on the path loss between the endpoint device and the satellite of the LPWAN satellite network.

9. The endpoint device of claim 4, wherein the GNSS ephemeris data is received from a ground-based network or from one or more satellites of the GNSS.

10. The endpoint device of claim 4, wherein the satellite of the LPWAN satellite network is in a same position as a position of the satellite of the GNSS at the time when the first data from the satellite of the GNSS was received if the satellite of the LPWAN satellite network is within a nearness tolerance of the position of the satellite of the GNSS at the time when the first data from the satellite of the GNSS was received.

11. The endpoint device of claim 10, wherein the nearness tolerance is a tunable parameter.

12. A system comprising:
a satellite configured to be placed in low Earth orbit as part of a low-power wide-area network (LPWAN) satellite network; and
an endpoint device including at least one processor and memory storing instructions that, when executed by the at least one processor, cause the endpoint device to:
receive GNSS ephemeris data for a Global Navigation Satellite System (GNSS);
receive, via an LPWAN satellite radio of the endpoint device, satellite ephemeris data for the LPWAN satellite network;
receive, via a GNSS receiver of the endpoint device, first data from a satellite of the GNSS the first data including time data;
determine, based at least on the first data from the satellite of the GNSS, a location of the endpoint device;
determine, based at least on the first data from the satellite of the GNSS, a signal strength of the satellite of the GNSS;
determine, based at least on the first data from the satellite of the GNSS, including the time data, the signal strength of the satellite of the GNSS, and the GNSS ephemeris data, position information for the satellite of the GNSS at a time when the first data from the satellite of the GNSS was received;
determine, based at least on the location of the endpoint device, the position information for the satellite of the GNSS, the time data, and the satellite ephemeris data, a time when the satellite of the LPWAN satellite network will be in a position to receive a transmission from the LPWAN satellite radio of the endpoint device; and
transmit second data via the LPWAN satellite radio at the time when the satellite of the LPWAN satellite network is in the position to receive the transmission.

13. The system of claim 12, wherein determining the time when the satellite of the LPWAN satellite network will be in a position to receive a transmission from the LPWAN satellite radio of the endpoint device is further based at least on directional characteristics of an antenna of the endpoint device, wherein determining the time when the satellite of the LPWAN satellite network will be in a position to receive a transmission from the LPWAN satellite radio of the endpoint device is further based at least on directional characteristics of an antenna of the endpoint device.

14. The system of claim 12, wherein the instructions comprise further instructions that, when executed by the at least one processor, further cause the endpoint device to determine, based at least on the signal strength of the satellite of the GNSS, a path loss between the endpoint device and the satellite of the GNSS.

15. The system of claim 14, wherein the instructions comprise further instructions that, when executed by the at least one processor, further cause the endpoint device to estimate, based at least on the path loss between the endpoint device and the satellite of the GNSS, and based at least on a difference in altitude between the satellite of the GNSS and the satellite of the LPWAN satellite network, a path loss between the endpoint device and the satellite of the LPWAN satellite network.

16. The system of claim 15, wherein the instructions comprise further instructions that, when executed by the at least one processor, further cause the endpoint device to adjust, prior to transmitting the second data from the endpoint device to the satellite of the LPWAN satellite network, a transmit power of the LPWAN satellite radio based at least on the path loss between the endpoint device and the satellite of the LPWAN satellite network.

\* \* \* \* \*